(No Model.) 2 Sheets—Sheet 1.
O. H. VENNER.
BICYCLE.
No. 246,988. Patented Sept. 13, 1881.
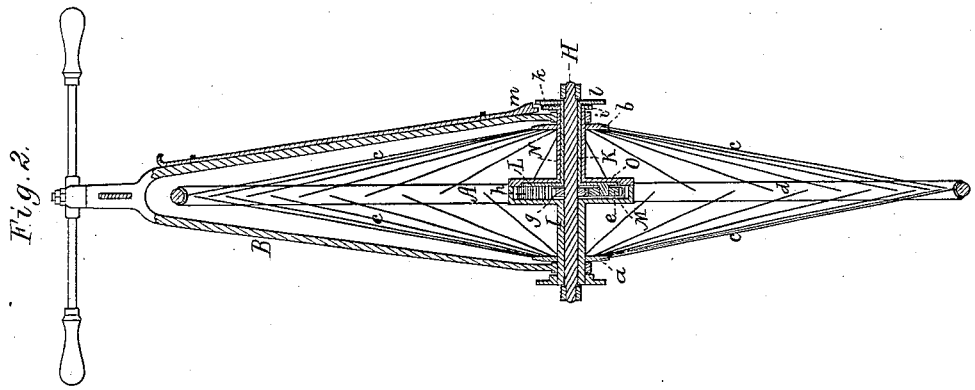
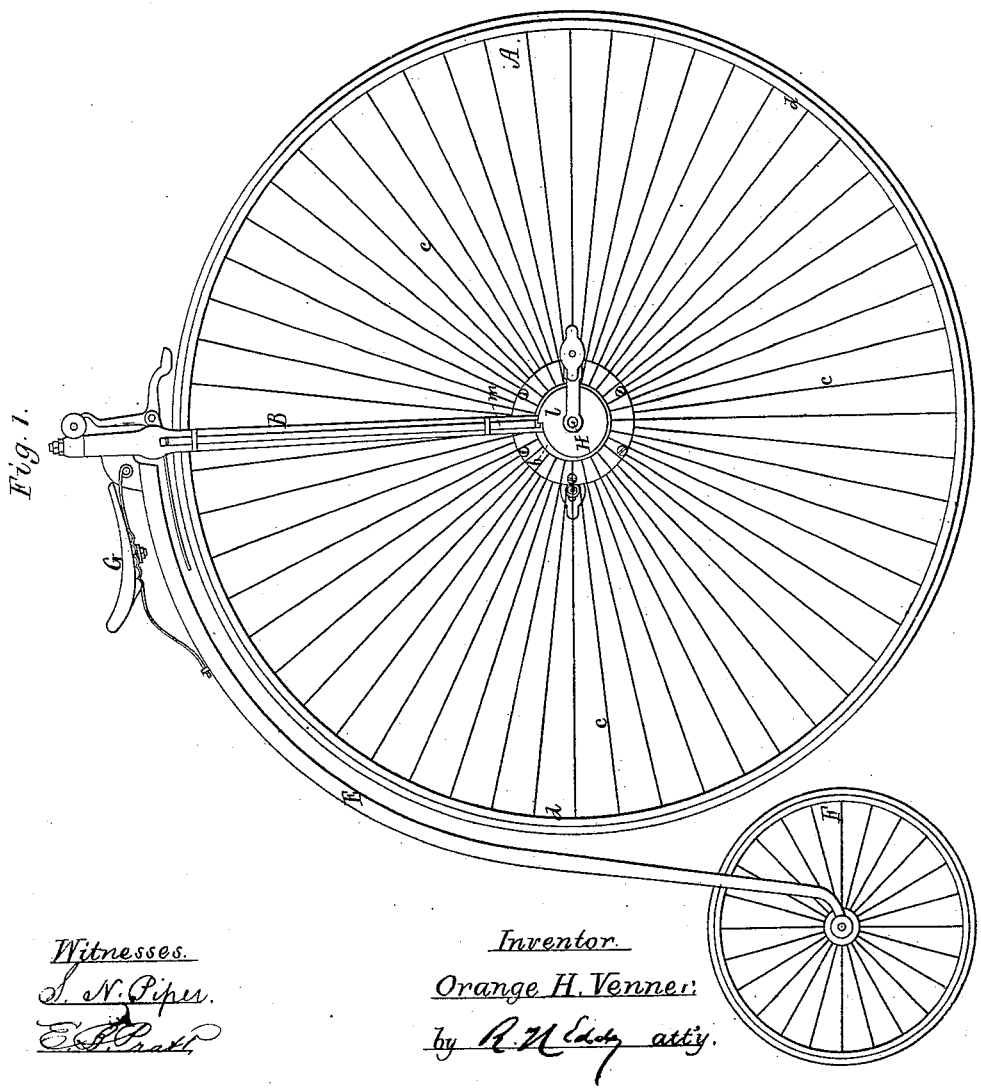
Witnesses.
J. N. Piper.
E. F. Pratt.
Inventor.
Orange H. Venner
by R. H. Eddy atty.

(No Model.) 2 Sheets—Sheet 2.
O. H. VENNER.
BICYCLE.
No. 246,988. Patented Sept. 13, 1881.
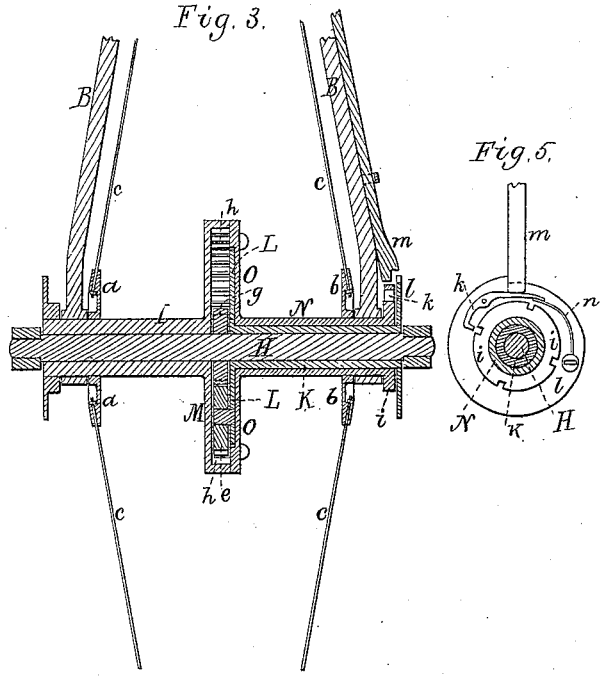
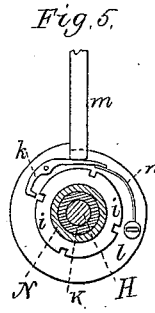
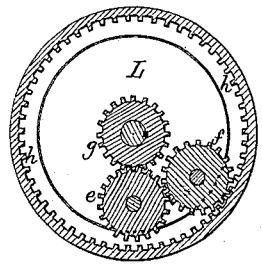
Witnesses.
S. N. Piper
Inventor.
Orange H. Venner.
by R. U. Eay atty

UNITED STATES PATENT OFFICE.

ORANGE H. VENNER, OF MALDEN, ASSIGNOR OF ONE-THIRTEENTH TO FREDERICK E. WOOD, OF SOMERVILLE, MASSACHUSETTS.

BICYCLE.

SPECIFICATION forming part of Letters Patent No. 246,988, dated September 13, 1881.

Application filed July 25, 1881. (No model.)

*To all whom it may concern:*

Be it known that I, ORANGE H. VENNER, of Malden, of the county of Middlesex and State of Massachusetts, have invented a new and useful Improvement in Velocipedes or Bicycles; and I do hereby declare the same to be described in the following specification and represented in the accompanying drawings, of which—

Figure 1 is a side elevation, and Fig. 2 a vertical and transverse section, of a bicycle provided with my invention. Fig. 3 is a transverse section of its operative mechanism on an enlarged scale. Fig. 4 is a longitudinal section, showing the gearing; and Fig. 5 is a section showing the locking devices, hereinafter described.

My invention is for the purpose of enabling the rider of a bicycle to exert his power with an increased effect, when necessary, to cause the vehicle to ascend a hill, though at a diminution of speed in comparison to what can be produced on level ground. It is well known that wheelmen generally experience much difficulty in riding their bicycles up a hill, often having to dismount and drag or force them up the acclivity.

With my improvement the necessity of dismounting is avoided, and the rider, while maintaining his seat, can with ordinary exertion impel the vehicle up the hill.

The nature of my invention is defined by the claims hereinafter presented.

In the drawings, A denotes the driving-wheel; B, its furcated supporter; and E is the forked arm that turns on the neck of the supporter, and carries the rear wheel, F, and indirectly supports the saddle or seat G.

H is the axle, to whose opposite ends the foot-cranks are fixed. This axle revolves loosely within a tube, I, arranged concentrically with it, and fixed permanently to one of the wheel-hubs $a\ b$, from which the spokes $c$ radiate to the felly $d$.

In range with the tube I is a tubular shaft, K, which encompasses and turns freely on the axle H, and within a tube, N, fixed to and projecting inward and outward from the hub $b$. The shaft K, at its inner end, has a disk, L, fastened to it concentrically, there being pivoted to such disk and arranged against its inner face two gears, $e\ f$, which engage with each other. The gear $e$, however, engages with a pinion, $g$, fixed on the axle H. The gear $f$ engages with an internal gear, $h$, projecting from the disk M, fixed to the tubular shaft I, which encompasses the axle H. A cap-plate or disk, O, is fixed to the tube N and to the internal gear, $h$, and there is fastened on the tube N, at its outer end, a wheel, $i$, having notches in its periphery, to engage the wheel with a lever catch or pawl, $k$, that is pivoted to the inner side of a catch-wheel, $l$, fixed on the tubular shaft K at its outer end.

A bolt, $m$, to engage with the catch-wheel $l$, is adapted to the furcated supporter B, so as to be capable of being slid up or down thereon, such bolt, at top, being within reach of the rider when he is astride of the saddle or seat. At its foot the bolt is directly over the tail of the catch $k$. On forcing the bolt downward it will not only engage with the toothed wheel $l$, so as to prevent the shaft K from revolving, but it will move the catch $k$, so as to force it out of engagement with the notched wheel $i$. On pulling upward the bolt $m$ a spring, $n$, fixed to the wheel $l$, will force the catch $k$ into engagement with the wheel $i$.

From the above it will be seen that when the catch $k$ is in engagement with the wheel $i$ the tubular shaft K becomes locked to the wheel A, so as to revolve only with it. Consequently, if the axle H be revolved by the rider, the gears $g\ e\ f\ h$ will not revolve, except with the wheel, which will be revolved by direct action of the cranks. But should it be desirous to exert the power of the rider with greater effect to revolve the wheel, though at a slower speed, he is to force the bolt downward, so as to cause the shaft K to be locked to the furcated supporter B and the catch $k$ to be forced out of engagement with the wheel $i$. This having been done, the gear $g$, revolving with the axle H, will turn the gear $e$, which will revolve the gear $f$ and cause it to revolve the internal gear, $h$, and consequently the wheel A.

Thus it will be seen how, by means of my invention, the bicycle-wheel can be revolved with greater power by a rider while ascending a hill, though at a less speed than when on a level.

What I claim as my invention is as follows, viz:

1. The combination, with a bicycle or velocipede wheel, A, its furcated supporter B, and crank-axle H, of mechanism, substantially as described, consisting of the series of gears $g$ $e$ $f$ $h$, the disks L O M, tubes I and N, tubular shaft K, catch-wheels $i$ and $l$, lever-pawl $k$, spring $n$, and bolt $m$, all being arranged and adapted essentially in manner and to operate as and for the purpose or purposes as explained.

2. The combination of the gears $g$ $e$ $f$ $h$, disks L M, tubes I N, tubular shaft K, catch-wheels $i$ and $l$, lever-pawl $k$, spring $n$, and bolt $m$, all being for application to a bicycle or velocipede driving-wheel, A, and its supporter B, substantially as and to operate as and for the purpose set forth.

ORANGE H. VENNER.

Witnesses:
R. H. EDDY,
E. B. PRATT.